Figure 1:
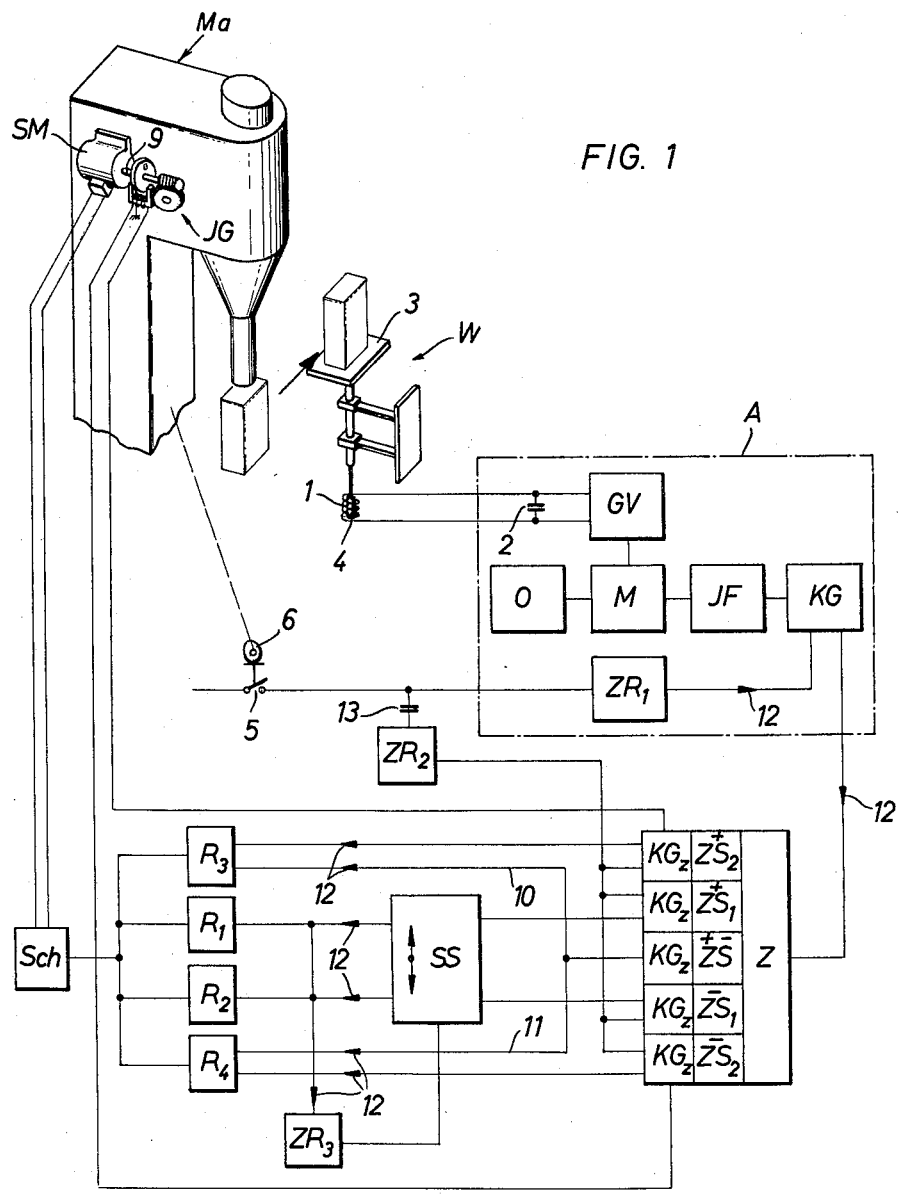

Jan. 7, 1964   U. BAUDER ETAL   3,116,801
MACHINE FOR MEASURING OUT FLUENT, POURABLE MATERIAL
Filed Nov. 1, 1961   5 Sheets-Sheet 2

Jan. 7, 1964  U. BAUDER ETAL  3,116,801
MACHINE FOR MEASURING OUT FLUENT, POURABLE MATERIAL
Filed Nov. 1, 1961  5 Sheets-Sheet 4

United States Patent Office 3,116,801
Patented Jan. 7, 1964

3,116,801
MACHINE FOR MEASURING OUT FLUENT,
POURABLE MATERIAL
Ulrich Bauder, Stuttgart, and Kurt Braun, Esslingen
(Neckar), Germany, assignors to Firma Fr. Hesser
Maschinenfabrik - Aktiengesellschaft, Stuttgart - Bad
Cannstatt, Germany, a corporation of Germany
Filed Nov. 1, 1961, Ser. No. 149,393
Claims priority, application Germany Nov. 4, 1960
14 Claims. (Cl. 177—1)

This invention relates to a method for the automatic regulation or adjustment of the measuring-out devices used in machines for measuring out fluent pourable material. In particular it relates to cases where control devices associated with the measuring-out devices are adapted to make appropriate correcting adjustments of the latter by means of electrical impulses in response to observed deviations of the actual weight of the pourable material from a predetermined target weight. The invention is also concerned with arrangements for performing this method.

It is known in connection with volumetrically-operated machines for dispensing fluent pourable materials to weigh individual quantities measured out by the machine, in batch sample fashion, by means of a succeeding control weigher and, where this measurement is found to deviate from a predetermined target weight, to effect a corresponding re-setting or adjustment of the measuring-out devices of the machine concerned. In this connection it has been found unprofitable if an adjustment is made every time a faulty amount is checked, because there is then a danger that the system for regulating the measuring-out devices will get into "oscillation" and, as a consequence, the control data becomes falsified.

For this reason it has previously been proposed to feed the measurements made by the control weigher first into an electro-magnetic or electronic integrating mechanism and to carry out a re-setting or adjustment when the measurements actually registered indicate a clear trend towards low or high values. The size of the regulation or adjustment was, in this case, set to a specific value. If the required adjustment lay above this value, further adjustments followed, at specific time intervals determined by the store in the integrating mechanism until the sum of these adjustments was of the magnitude required by the measurements at the control weigher. Where deviations in the specific weight of the fluent material were small, and at normal machine output rates, this arrangement stood up to requirements and produced comparatively accurate charge weights. However, in the event of a further and substantial increase in the discharge rate from the weigher, it has been found that the regulating process described above acts too sluggishly; this has a detrimental effect particularly in the event of wide fluctuations in the specific weight, because the discharging machines still deliver a large number of charges of false weight, as a result of the incidence of the variation in specific weight of the material, before the regulation has re-established correct conditions.

An object of the present invention is to avoid this drawback. To this end it is proposed, in accordance with the present invention that, in carrying out the process described in the preamble of this specification, in the event of the occurrence of deviations from the target quantity beyond a pre-set minimum the electrical impulses shall be transmitted to an electro-mechanical or electronic integrating means which are adapted to effect a single correction of the measuring devices only after a pre-selected sum of the said minimum deviations has been reached, and that all the electrical adjustment impulses representing a deviation of a predetermined larger order of magnitude from the target quantity shall be employed directly for correction of the measuring devices; the correction adjustments can optionally either be of a predetermined magnitude or correspond directly to the deviation from the target quantity which is determined by the control devices.

This method is particularly advantageous when used for re-setting or adjusting the regulating means of make-up feed controls in automatic discharge or batch weighers, and also for re-setting or regulating the adjusting means of dispensing machines; not only does it avoid the detrimental oscillations, mentioned above, of the regulating means in the case of the more usual small fluctuations in the measurement, but also affords a very rapid response in the case of larger changes in the specific weight, as occur for example during starting up of the machine or when changing over the material feed to different supply containers. By use of the invention, the number of charges of material of false weight is reduced to a fraction of what this has hitherto been.

A further object of the invention is an advantageous arrangement for implementing the method described above.

In one form, and more particularly where control weighers are used as the control devices, this is characterised by an analogue-digital transducer which is coupled, inductively or capacitively with the control device or weigher, and is connected to an impulse-controlled discriminator, the output of which is adapted to be connected, in accordance with the impulses received, selectively with an integrating storage unit of any suitable type, connected up to the adjusting means, or directly to the regulating means themselves.

Further, to furnish an arrangement which uses the electrical voltage, put out by a control weigher and corresponding to the actual weight registered at the time, for controlling or correcting the measuring-out machine, in accordance with a further feature of the invention an electrical voltage transformer, connected with the control weigher, has associated therewith a number of voltage-responsive relay units, each set to a specific voltage range, one part of these units being directly connected to the adjusting means for correcting or controlling the measuring-out machine, and the other part being connected to the same through an integrating storage unit of known form.

Further objects of the invention lie in a special grouping and arrangement of the voltage-responsive relay units in these arrangements.

Below we refer, in connection with the attached diagrammatic layout drawings, to examples of use of the invention; the latter is not, of course, limited to these particular examples.

In the drawings:

FIGURE 1 is a wiring diagram of an arrangement for regulating a dispensing machine operated on a volumetric principle.

Figure 2:
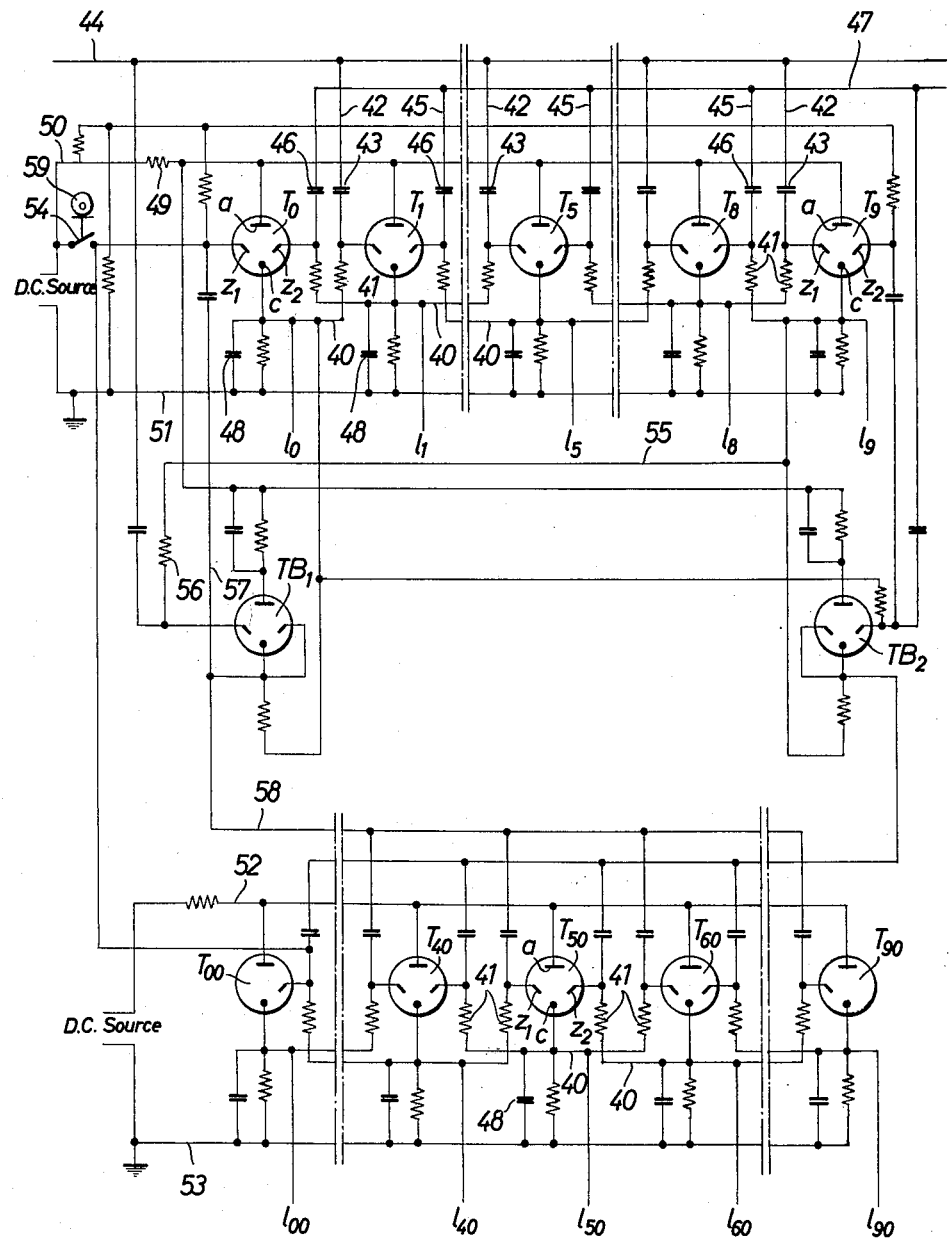
Figure 3:
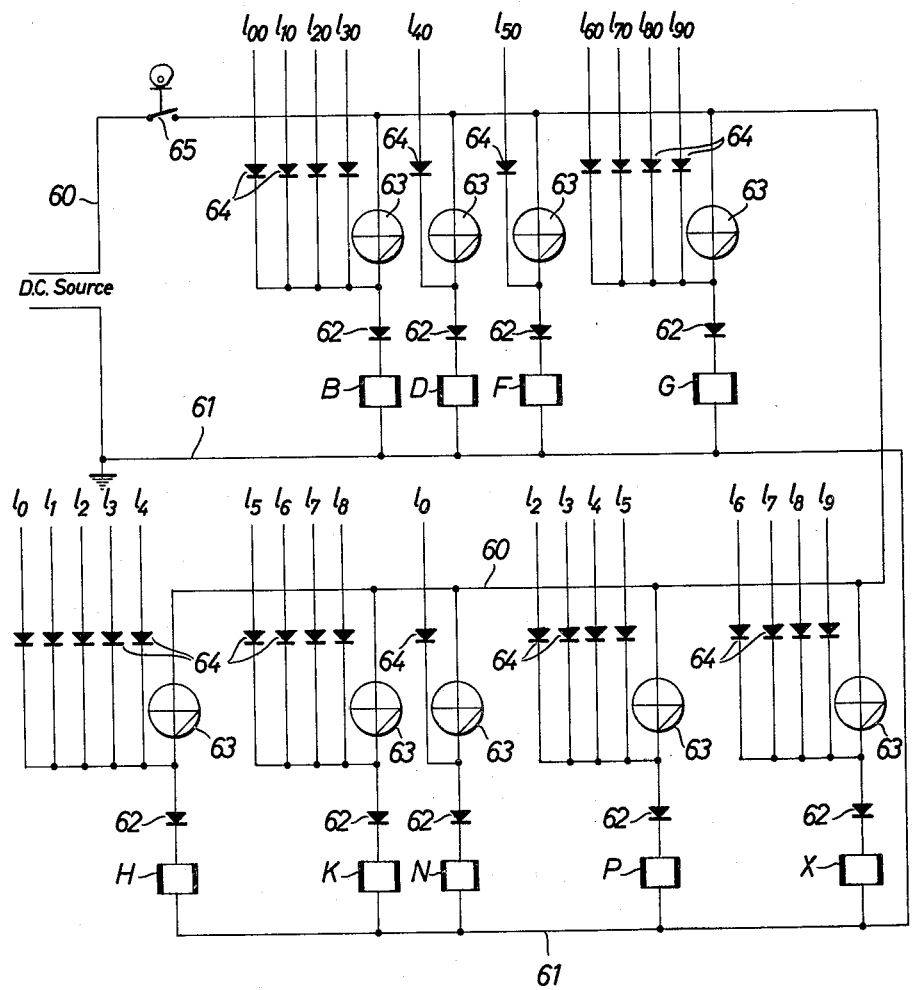
Figure 4:
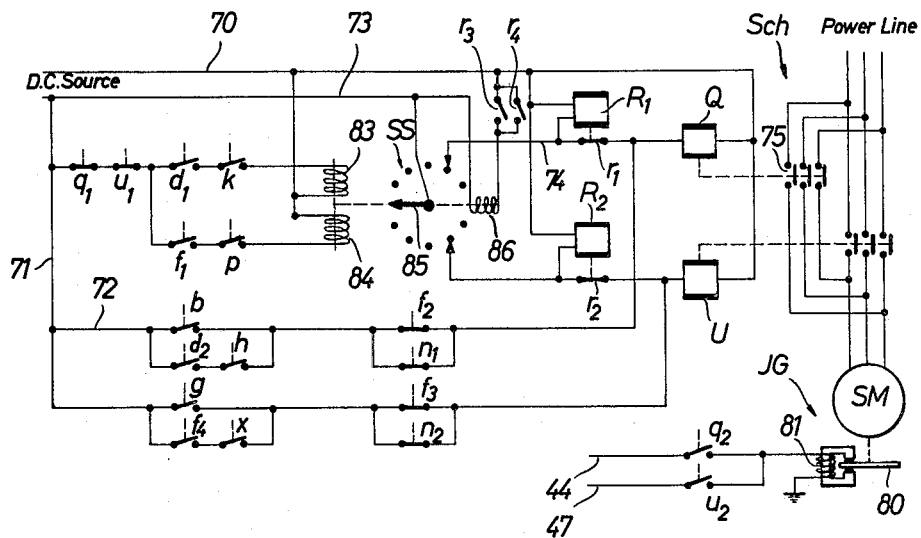
Figure 5:
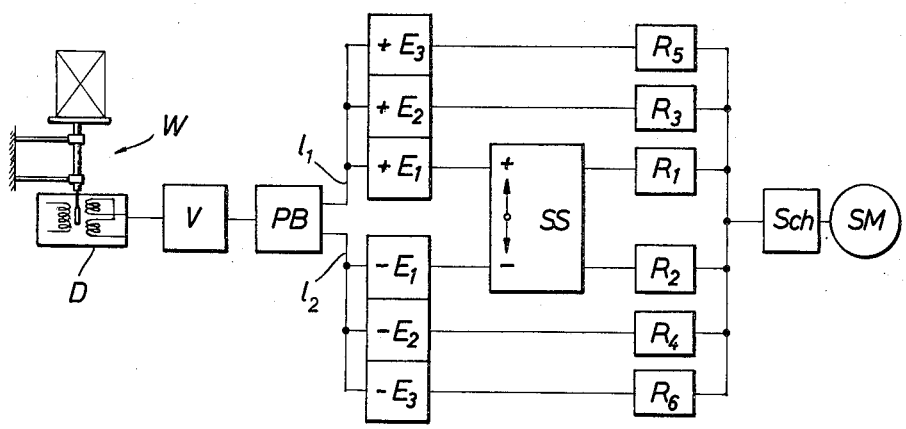
Figure 6:
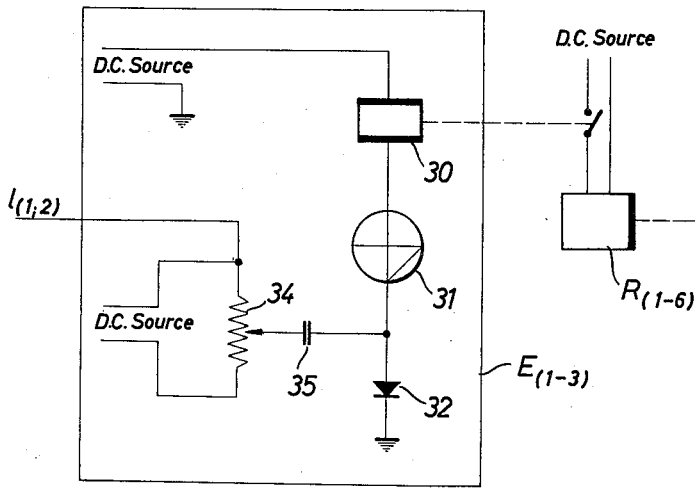

FIGURE 2 is a wiring diagram of an impulse counter which may be used in this arrangement, FIGURE 3 is a diagram of a utilization device which is connected up to the counter, FIGURE 4 is a wiring diagram of the connections of this utilization device, FIGURE 5 is a further diagram of an arrangement for regulating a measuring-out machine, and FIGURE 6 reproduces the connections of a voltage-responsive relay unit of the latter.

The regulation of the measuring-out machine, which in the present example is assumed to be a dispensing machine Ma operating on a volumetric principle, is performed by an adjusting motor SM governed by a control weigher W. The control weigher W is arranged in sequence after the dispensing machine Ma and receives the quantities of charging material measured out by this machine, for the purpose of checking the overweights or underweights from a preset target weight. These weighings may be gross weights or net weights. The latter may, for example, be derived by a special measuring out device which takes samples of the charging material directly from the feed of the latter to a measuring out machine and conducts the separated and measured individual quantities to the control weigher.

In the first embodiment illustrated in FIGURE 1, the control weigher W acts inductively on an oscillation generator or oscillator GV of a suitable standard form, the frequency of which is dependent on the position of the weigh pan 3 of the weigher W. Important parts of the oscillatory circuit associated with the oscillation generator GV are a coil 1, a condenser 2 and a core 4 which is connected to the weigh pan 3 and is freely movable in the coil 1. The oscillation generator GV, of variable frequency, and a further oscillation generator or oscillator O of constant frequency are both connected to a mixing stage M which is coupled in turn with an impulse former JF.

The two oscillation generators GV and O, together with the mixing stage M and the impulse former JF, a time relay $ZR_1$, and a coincidence member KG constitute a so-called analogue-digital transducer A, and this emits impulses of a specific number depending on the position of the weigh pan 3. A detailed illustration and description of the analogue-digital transducer A is here omitted since equipment of this nature is well known at the present time in commerce and industry. In this regard it is only to be pointed out that the beat passed from the mixing stage M to the coincidence member KG is transformed by the time relay $ZR_1$, which is set to a predetermined closure period, in accordance with the beat frequency, into a number of impulses determined by the movement of the weigher. The time relay $ZR_1$ is controlled by a contact 6 which is suitably operated by a camshaft 6 in accordance with the timing of the dispensing machine Ma.

The outlet of the analogue-digital transducer A, or the coincidence member KG thereof, is connected to an electronic counter Z which in turn is equipped with a plurality of electronic intermediate storage units ZS and associated coincidence members $KG_z$.

In explanation of these connections, it will be assumed that the analogue-digital transducer A and the time relay $ZR_1$ are set so that the variations in weight normally to be anticipated correspond to impulse counts 0–100. Thus the count 50 is the zero value or, stated in other terms, the target weight. Since small variations in weight are not to be adjusted immediately but only after a particular tendency has set in, it will be assumed that the first deviations to be adjusted will be more than ±5 grammes. This would mean that, with one gramme equated to one impulse, the immediate adjustment would start at 56 impulses, at one side, and at 44 impulses on the other.

For this purpose the counter Z is connected up so that, for 52–55 impulses it operates on the intermediate storage unit $ZS_1$ on the plus side, and for 48–45 impulses it operates on the intermediate storage units $ZS_1$ on the minus side. In the case of impulses 56 et seq. upwards, and from 44 et seq. downwards, the intermediate storage units $ZS_2$ on the plus and minus side, respectively are operated. Impulses between 49 and 51 pass to the intermediate storage unit ZS but no notice is taken of them because they represent variations within a permissible tolerance.

Connected to the intermediate storage units $ZS_1$ and the coincidence members $KG_z$ associated therewith is an electronic integrating storage unit SS which sums the plus and the minus impulses. If the residual sum of the plus and minus impulses exceeds a specific, adjustable figure, a corresponding plus or minus impulse is transmitted to a relay $R_2$ or $R_1$. These, through a relay Sch, switch in the aforesaid adjusting motor SM and this applies an adjustment, of a size which preferably can be regulated at the relay $R_1$ and $R_2$, to the measuring means of the dispensing machine. After a certain time delay, imposed by a time relay $ZR_3$, this impulse extinguishes the integrating storage unit SS through conduits 7 or 8, so that this unit stands ready for re-use.

Should the counter Z count more than 55 or less than 45 impulses, these pass to the intermediate storage unit $ZS_2$ with its associated coincidence members $KG_z$. Again these switch on the adjusting motor SM, in one direction or the other, through the relay $R_3$ or $R_4$. Since in this instance the adjustment is to take place directly in accordance with the weight variation, the relay $R_3$ or $R_4$, as the case may be, remains connected up. Provided on the adjusting means of the dispensing machine, for example on the driving shaft 9 of the adjusting motor SM, is an impulse transmitter JG which is connected to the coincidence members $KG_z$ of the intermediate storage units $ZS_2$. Depending on the direction of rotation of the adjusting motor SM, this impulse transmitter JG feeds a number of negative or positive impulses to the intermediate storage unit $ZS_2$ concerned until the impulses stored therein have been reduced or increased to the FIGURE 50. At this time the relay $R_3$ or $R_4$ is collapsed under the action of the coincidence member $KG_z$ of the storage unit ZS through the connections 10 or 11, and hence the motor SM stops.

The arrow symbols in the accompanying drawings in each case represent the particular direction of the passaging current. After a specific period, determined by the length of the control procedure, the counter Z is extinguished and is then restored to its starting condition. The lapse of time required for this is set by a delay relay $ZR_2$ which is connected to the time relay $ZR_1$, via a condenser 13, on one side and the counter Z or the coincidence member $KG_z$ thereof on the other.

The connections described can be developed without any problem. Thus, for example, it is possible to provide further intermediate storage units at the counter Z, for instance, starting again on the basis of impulse counts 0–100, choosing a stage of 56–60 or one from 46–50. With this range of impulse count, a single adjustment of preselected order of magnitude can be performed, the integrating storage unit being by-passed. In this event, the coincidence member of the intermediate storage unit concerned is again connected to the relay $R_1$ or $R_2$ and this would produce a single switching in of the adjusting motor SM for a specific, adjustable period, as occurs in the event of regulation via the integrating storage unit.

If desired the stage with a regulation directly dependent on the size of the weight variation could be dispensed with. In place of this stage, one or more further intermediate storage units would be used, for example for 56–65, 66–75, and 76–100 impulses. These intermediate storage units would then, in each instance, be connected to a special relay incorporated in the control circuit of the adjusting motor SM. The durations of hold of the relays are then so set then so set that the value of the adjustment, in this case one only, produced thereby is size graduated, i.e. the degree of adjustment for an impulse count of 76–100 is more than that corresponding to an impulse count of 66–75, and the latter in turn is more than that for 56–65 impulses.

Obviously a large number of combinations of stages is possible in this way, but all these do not need to be described.

The connection diagram of the above-mentioned electronic counter Z is illustrated in FIGURE 2. This consists of a units decade and a tens decade of counter tubes, a relay tube $T_0 \ldots T_9$, and $T_{00} \ldots T_{90}$ being provided in each decade for the respective counter stages. Each of these relay tubes, or cold cathode relay tubes, T has an anode $a$, a cathode $c$ and two trigger electrodes $z_1, z_2$. The individual tubes of each decade are connected together in such a way that, respectively, the trigger electrode $z_2$ of one tube and the trigger electrode $z_1$ of the second-adjacent tube are connected to the cathode $c$ of the intermediate tubes through lines 40 and resistances 41. Moreover the trigger electrodes $z_1$ of the units decade are connected through lines 42 and condensers 43 to a line 44 leading to the analogue-digital transducer A and to the impulse transmitter IG, for the forward counting. The trigger electrodes $z_2$ of the tubes $T_0$ and $T_9$ are connected through lines 45 and condensers 46 with a line 47 which leads to the impulse transmitter IG for reverse counting only.

The anodes $a$ and cathodes $c$ of the tubes $T_0 \ldots T_9$ and $T_{00} \ldots T_{90}$ are connected to a D.C. source through lines 50, 51 and 52, 53 respectively.

Operation of counter Z is prepared by firing the tubes $T_0$ and $T_{00}$, and this occurs as a result of the closure of contacts 54 by means of a cam 59 which is operated periodically by the measuring-out machine Ma.

When the tube $T_0$ becomes conductive, a pretension is applied to the trigger electrode $z_1$ of the tube T, but this is not sufficient to fire the tube $T_1$. Only when a voltage impulse comes from the analogue-digital transducer through conduits 42 and 44 is the tube $T_1$ fired by the combined voltage. The cathode condenser 48 of the tube $T_1$ then receives a powerful charging current through the tube and the common anode resistance 49 of the counter stages, because the anode voltage of the tube $T_1$ collapses when the latter is discharged at its firing voltage, so that the previously conductive tube $R_0$ is extinguished. One impulse is thus counted. However, at the same time the tubes $T_0$ and $T_2$ are prepared for firing, because their trigger electrodes $z_2$ and $z_1$ respectively are at a voltage which is less than that of the cathode $c$ of the tube $T_1$. When further impulses pass along line 44 from the analogue-digital transducer A, successive tubes are fired in turn in the above fashion. When the tube $T_9$ fires, in addition to the tube $T_8$ (trigger electrode $z_2$), a relay tube $TB_1$ arranged between the units and the tens decades is also prepared through a line 55 and a resistance 56, so that when the next "positive" impulse occurs, this relay tube $TB_1$ fires, as a result of which the tube $T_{10}$ is also fired through the line 57, tube $T_0$ and line 58.

The reverse counting on the counter takes place by introducing impulses through line 47. The respective trigger electrodes $z_2$ of the tubes T receive these impulses and, as appropriate, the tube prepared for firing by the appropriate electrodes $z_2$, and connected up in advance of the previously-fired tube T, is fired.

To utilise the impulses counted up in the counter, use is made of relay units associated with the counting stages, and the wiring diagram of these units is shown in FIGURE 3 of the drawings. These relay units are disposed in the circuit of a DE source with the lines 60, 61, and in each case consist of a relay B, D, F, G, H, K, N, P and X, a rectifier 62 serving as a gate, and a Shockley-diode 63. These relay units are connected to the individual stages of the counter through rectifiers 64 and lines $l_0 \ldots l_9$ and $l_{00} \ldots l_{90}$, and in each case with the cathode $c$ of the corresponding tube T. With the voltage applied between the lines 60 and 61, the Shockley-diodes 63 are non-conducting, but when a higher voltage is applied, they switch to a lower resistance so that the relay in the circuit thereof is energised. This switching over of the Shockley-diodes is brought about and controlled by the cathode voltage of the tubes T.

The time at which the impulses summed up in the counter Z are utilised is determined by a timing element, for example a contact 65 disposed in the circuit of the relay unit and controlled from the dispensing machine Ma. The relay units connected with the relay tube T which has just been fired are switched through each time, the contacts thereof being operated.

The contacts of the relays B, D, F, G, H, K, N, P and X are shown in FIGURE 4 and are indicated by small letters corresponding to the large letters identifying the associated relays.

The operation of the utilization device described above will now be illustrated by the following few examples:

It is assumed that the counter has counted 37 impulses, so that when there is a response by the timing element 65 through the energised lines $l_{30}$ and $l_7$, the relay units B, K and X are switched through. As a result the contacts $b$ and $k$ are closed, whilst contact $x$ is opened. However, only the contact $b$, through lines 71, 72 and 70, closes the circuit to a relay Q, in response to the excitation of which the contacts 75 of the switch relay Sch are closed, so that the adjusting motor SM is connected to the power line and turns in the "positive" direction.

As a result of this a disc 80 of the impulse transmitter JG is set into rotation and produces an impulse (for each rotation of a point magnet in the winding 81 of the impulse transmitter JG); these impulses are conducted through the line 44 into the counter Z when the contact $q_2$ is closed. This adjustment is continued until the value 50 is reached in the counter. At this moment the relay units F, H and N connect through so that the circuit of relay Q is interrupted by opening the back contacts $f_2$ and $n_1$ and consequently the adujsting motor SM is stopped again.

To arrange that the integrating storage unit SS is not connected up where direct adjustment is performed, the back contacts $u_1$ and $q_1$ are opened when the relays U and Q respond, so that the electromagnetic windings 83 and 84 cannot in any event apply an attraction.

A direct adjustment of the dispensing machine takes place in similar fashion when values above 55 are recorded, but with the difference that here the adjusting motor SM turns in the "negative" direction and the impulses from the impulse transmitter JG are passed to the counter through line 47 so as to subtract until the value 50 is reached.

At the values 45–48 the relays D, K and X are brought in, the latter, viz X being of no significance. The contacts $d_1$ and $k$ are closed so that the electromagnetic winding 83 of the integrating storage unit SS is energised. The movable contact arm 85 is then turned on through one step in the clockwise direction. If a value in the range 45–48 appears frequently, for example four times, current is applied to the contact 85 and the conduit 74 of relay Q, through a line 73, and the result of this is to start the adjusting motor SM. At the same time, a time relay $R_1$ is energised and this, after a specific, adjustable period of time, opens its contact $r_1$ and thereby re-interrupts the circuit to the relay Q, so that the adjustment is terminated.

The adjusting motor SM is connected to the power line by means of a relay U in similar manner, if this relay responds after multiple occurrence of counts in the range 52–55.

The re-setting to zero of the movable contact arm 85 of the integrating storage unit SS is accomplished, after each corrective adjustment of the dispensing machine, by means of an electromagnet 86 and by closure of one of the contacts $r_3$ and $r_4$, one of which is associated with the time relay $R_1$ and the other with the time relay $R_2$. In addition it is to be noted that the control arrangement described, which performs an appropriate regulation after a specific number of impulses, can again be associated with a control weigher which is checked by a variable capacity condenser, and the detected frequency corresponding to the checked weight converted in an analogue-digital transducer into a corresponding number of impulses.

Similarly, in the case of control weighers in which the exploitation takes place through electrical, weight-responsive voltage signals of a voltage converter, for example a differential transformer, the latter can be coupled through an analogue-digital transducer A, of a commercially available type, adapted to convert a variable electrical voltage into a number of electrical impulses corresponding to the magnitude of this voltage.

An example of an arrangement according to the invention which is illustrated in FIGURES 5 and 6, and will now be described, is used for regulating a dispensing machine (not shown) or the make-up, afterflow regulator of an automatic batch weigher of known form (and also not shown), the adjusting means of which are operated by a reversible adjusting motor SM. The adjusting motor SM is controlled by a control weigher W to which the measured-out charging material is fed.

In the example illustrated the control weigher W is again of the spring balance type, and the weighing movements of the latter are measured by an electrical voltage transformer, for example a differential transformer D. The movable core of the differential transformer D is set so that, in the position corresponding to the target weight, there is a starting voltage equated with zero, and that underweights or overweights produce corresponding voltages which are related to the particular weight variations, the differential between underweight and overweight being indicated by a phase shift of the starting current.

The starting voltages determined by the control weigher W and transmitted by the differential transformer D are amplified in a suitable amplifier V connected thereto and passed to a phase bridge PB of known form, which segregates the incoming impulses into plus or minus impulses in accordance with their phase positions.

Connected to the phase bridge PB are two groups of voltage-dependent relay units $+E_1$, $+E_2$, $+E_3$ and $-E_1$, $-E_2$, $-E_3$, and these are connected to the corresponding output of the phase bridge PB for positive and negative impulses respectively. Within each of these groups, each relay unit E is set to a specific response voltage, the graduation of the response voltages corresponding in each case to a specific weight range. It can be assumed, for example, that the relay units $+E_1$ and $-E_1$ are set to 10 volts, the relay units $+E_2$ and $-E_2$ to 20 volts, and the relay units $+E_3$ and $-E_3$ to 40 volts.

The voltage range from 0 to 10 volts is to represent a desirable mean weight of the quantities of filling commodity weighed out, the voltage range of 10 to 20 volts a weight range lying within a permissible weight tolerance, and the voltage range from 20 to 40 volts, and over 40 volts, weight deviations at which an immediate adjustment of the measuring machine shall take place or the weighed out amount be separated from the ensuing packaging procedure.

In the arrangement illustrated in FIGURE 6 the important part of the voltage-dependent relay units E is a Shockley-diode 31 which, when a specific voltage is applied thereto, switches over from a high to a low resistance and becomes conductive. Moreover, the relay units E comprise a relay 30 which is connected up in circuit with the Shockley-diode 31 and a rectifier 32. The relay units E are set, through the agency of a condenser 35, and by means of a potentiometer 34 to a specific response voltage. Impulses of a predetermined voltage from the phase bridge PB are transmitted via the leads $l_1$ or $l_2$, the potentiometer 34, and the condenser 35, to the Shockley-diode 31.

When one of the relay units $+E_2$, $+E_3$, $-E_2$ or $-E_3$ is connected through, an associated time relay $R_3$, $R_5$, $R_4$ or $R_6$ respectively, receives an impulse by means of which the time relay R concerned is connected through a switch relay Sch to the adjusting motor SM of the regulating arrangement for a specific time period. The period during which the individual time relay R remains connected up is set to the time required for correcting the corresponding weight range.

In contrast to this correction, directly-initiated in the event of impermissibly large weight variations occurring, in the case of weights which lie within permissible tolerances, but nevertheless surpass a specific, predetermined limit, there is first a storage and summation of the impulses emitted by the relay units $+E_1$ and $-E_1$. For this purpose an electronic or electromechanical integrating storage unit SS of known form is connected behind each of these two relay units and is adapted, when there is a specific (adjustable) sum of positive and negative impulses, to switch in one of the time relays $R_1$ or $R_2$ which brings in the adjusting motor SM through the relay Sch for a specific time.

To guarantee that "strays," that is to say packages exhibiting random large weight variations, and generally attributable to defects in the feed of fluent material, from influencing the regulation of the measuring-out apparatus, the relay units $+E_3$ and $-E_3$ can be arranged so that they merely operate a rejection device and that the associated time relays $R_5$ and $R_6$ do not provoke any adjustment of the measuring-out apparatus.

Moreover to allow for a finer or coarser graduation of the weight variation, respectively more or less than three relay units E may be provided in each group, correspondingly set time relays R being connected in series therewith.

Advantageously, the relays 30 of the relay units E are so constructed and connected that, in the event that a relay unit of higher voltage response is connected through, that of lower voltage response is cut out. It will be understood that impulses transmitted to the relay units E are regularly extinguished after each weighing operation by appropriate interrupters. Likewise the impulses in the integrating storage unit SS are extinguished when the measuring-out apparatus has been regulated after a selected number of impulses have been recorded.

We claim:

1. In a machine for measuring out fluent, pourable material and comprising measuring-out apparatus and a control device for correcting the operation of said measuring-out apparatus, a method of automatically adjusting said measuring-out apparatus, in which weight deviations from a pre-set target figure are converted into corresponding electrical impulses, summing up to a preselected total those impulses produced by weight deviations falling inside of preselected narrow limits, using said preselected total of impulses to cause a correction of the measuring-out apparatus, and using those impulses produced by weight deviations falling outside of said preselected narrow limits for direct correction of said apparatus.

2. A method as claimed in claim 1, in which the said corrections are of a predetermined magnitude.

3. A method as claimed in claim 1, in which the direct correction is proportional to the deviation from the target figure.

4. In a machine having apparatus for measuring-out fluent, pourable material, a control system comprising a control weigher associated with said measuring-out apparatus and having weight-responsive means, transformer means for converting weights detected by said control weigher into electrical impulses, an analogue-digital transducer electrically coupled to the control weigher, an impulse-responsive discriminator connected to said transducer, means for adjusting said measuring-out apparatus, an impulse-storage unit in said discriminator connected to said adjusting means and means connecting the outlet of said discriminator selectively to said storage unit or to said adjusting means.

5. In a machine having apparatus for measuring-out fluent, pourable material, a control system comprising a control weigher associated with said measuring-out apparatus and having weight-responsive means, transformer means for converting weights detected by said control weigher into electrical impulses, an analogue-digital transducer electrically coupled to the control weigher, means for adjusting said measuring-out apparatus and an impulse-responsive discriminator connected to said transducer, said discriminator comprising an electronic counter, a plurality of electronic intermediate storage units connected to said counter, coincidence members connected to said storage units, an integrating storage unit connected to selected coincidence members, and switch relays connected respectively to said integrating storage unit and directly to selected coincidence members, all said switch relays being coupled to said adjusting means.

6. A control system as claimed in claim 5, in which said adjusting means comprises an adjusting motor having an impulse transmitter associated therewith, said impulse transmitter being indirectly coupled through a coincidence member with a first intermediate storage unit on the plus side of said counter, and similarly with a second intermediate storage unit on the minus side of said counter, and through said members with the corresponding switch relays, whereby said relays, excited by control impulses, will collapse when counter impulses from said impulse transmitter, to the associated intermediate storage units substantially extinguish impulses fed into these intermediate storage units from said transducer and stored in the same, or when the number of these impulses is increased to a pre-set mean value.

7. A control system as claimed in claim 6, in which coincidence members of intermediate storage units not connected to said integrating storage unit are each connected to a relay disposed in the control circuit of said adjusting means, the holding periods of said relays being regulatable in graduated fashion to control the operating periods of said adjusting means.

8. A control system as claimed in claim 5, in which said adjusting means comprises an adjusting motor having an impulse transmitter associated therewith and connected to selected switch relays, and one of said intermediate storage units is connected with said integrating storage unit, directly with one or more further relays disposed in the control circuit of said adjusting motor, and with one of said selected switch relays.

9. A control system as claimed in claim 5, further including a first time relay connected to said counter and adapted to extinguish the same, and a second time relay connected at its outlet side to said first time relay and at its inlet side to a coincidence member of the analogue-digital transducer.

10. A control system as claimed in claim 4, in which said analogue-digital transducer comprises an oscillator means of fixed frequency coupled to said control weigher, a mixing stage connected to said oscillator means, an impulse former connected to said mixing stage, a coincidence member connected to said impulse former, and a time relay connected to said coincidence member.

11. In a machine having apparatus for measuring-out fluent, pourable material, a control system comprising a control weigher disposed to receive material handled by said weighing-out apparatus, an electrical voltage transformer operatively connected to said control weigher, a plurality of voltage-responsive relay units connected to said transformer and set to contrasting voltage ranges, control means for adjusting the operation of said weighing-out apparatus and an integrating storage unit connected to selected relay units only and to said control means, the other of said relay units being connected directly to said control means.

12. A control system as claimed in claim 11, in which said voltage-responsive relay units are disposed in two groups which are respectively connected to two phase-dependent outlets of a phase bridge series-connected to said voltage transformer.

13. A control system as claimed in claim 11, in which an adjustable time relay is connected between the outlet side of each voltage-responsive relay unit and said control means, and each of said time relays is set to a specific range of faulty weight measurements determined by said control weigher.

14. A control system as claimed in claim 11, in which each voltage-responsive relay unit comprises a relay device, a Shockley-diode connected to said relay device, and an adjustable resistance connected to said Shockley-diode.

References Cited in the file of this patent

UNITED STATES PATENTS

| | | |
|---|---|---|
| 2,664,557 | Sargrove | Dec. 29, 1953 |
| 2,729,213 | Broekhuysen | Jan. 3, 1956 |
| 2,801,819 | Lindars | Aug. 6, 1957 |
| 2,974,863 | Williams | Mar. 14, 1961 |